(12) United States Patent
Dent et al.

(10) Patent No.: US 8,160,176 B2
(45) Date of Patent: Apr. 17, 2012

(54) COMPENSATING PRE-FILTER FOR AN OFDM TRANSMITTER

(75) Inventors: Paul Wilkinson Dent, Pittsboro, NC (US); Ali S. Khayrallah, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 418 days.

(21) Appl. No.: 12/562,225

(22) Filed: Sep. 18, 2009

(65) Prior Publication Data

US 2010/0226416 A1   Sep. 9, 2010

Related U.S. Application Data

(60) Provisional application No. 61/157,615, filed on Mar. 5, 2009.

(51) Int. Cl.
*H04L 27/00* (2006.01)
*H04L 5/16* (2006.01)
(52) U.S. Cl. ........................ 375/295; 375/219
(58) Field of Classification Search ............... 375/295, 375/260, 219, 298, 308, 350, 296; 455/114.3, 455/126
See application file for complete search history.

(56) References Cited

U.S. PATENT DOCUMENTS

| | | | |
|---|---|---|---|
| 5,959,967 A | 9/1999 | Humphrey et al. | |
| 6,608,529 B2 | 8/2003 | Franca-Neto | |
| 7,023,929 B2 | 4/2006 | Mujica et al. | |
| 7,339,918 B2 | 3/2008 | Piirainen | |
| 7,450,532 B2 | 11/2008 | Chae et al. | |
| 8,068,797 B2* | 11/2011 | Gan et al. | 455/114.3 |
| 2003/0103578 A1 | 6/2003 | Yeh et al. | |
| 2004/0252632 A1 | 12/2004 | Bourdoux et al. | |
| 2005/0118977 A1 | 6/2005 | Drogi et al. | |
| 2007/0201535 A1* | 8/2007 | Ahmed | 375/135 |
| 2008/0159422 A1 | 7/2008 | Chen et al. | |
| 2008/0318613 A1 | 12/2008 | Balachandran et al. | |
| 2009/0054012 A1 | 2/2009 | Lin et al. | |
| 2009/0092193 A1 | 4/2009 | Fujita | |

FOREIGN PATENT DOCUMENTS

WO   2006/007599 A2   1/2006
WO   2007/092945 A2   8/2007

OTHER PUBLICATIONS

Bourdoux, Andre et al., "Non-reciprocal Transceivers in OFDM/SDMA Systems: Impact and Mitigation," 2003 IEEE, pp. 183-186.

* cited by examiner

*Primary Examiner* — Khai Tran
(74) *Attorney, Agent, or Firm* — Coats & Bennett, P.L.L.C.

(57) ABSTRACT

A method and apparatus for reducing group delay and/or amplitude errors applied to a transmission signal by one or more transmission filters is described herein. The present invention characterizes the errors introduced by one or more transmission filters relative to a desired frequency response, e.g., the group delay and/or amplitude errors relative to a flat group delay and flat amplitude, respectively. Based on the errors, the present invention pre-compensates the digital frequency domain samples used to generate the transmission signal. In so doing, the present invention reduces the errors in the filtered transmission signal without placing limits on the design of the transmission filters.

22 Claims, 10 Drawing Sheets

COMPENSATING PRE-FILTER FOR AN OFDM TRANSMITTER

This application claims priority from Provisional U.S. Patent Application No. 61/157,615, filed 5 Mar. 2009, and from U.S. patent application Ser. No. 12/541,426 filed 14 Aug. 2009, both of which are incorporated herein by reference.

BACKGROUND

The invention described herein relates generally to OFDM wireless communications, and more particularly to an OFDM transmitter that pre-compensates digital frequency-domain samples for transmission filter deviations from a flat amplitude and/or group delay across the allocated spectrum.

Orthogonal Frequency Division Multiplexing (OFDM) is a digital multi-carrier modulation technique that uses a plurality of closely-spaced orthogonal subcarrier frequencies to carry data. OFDM operates by dividing a spectrum of transmission data into multiple narrowband sub-channels with a specific spacing termed "orthogonal spacing," where a fraction of the total data rate specified for the transmission data is modulated onto each sub-channel with a conventional modulation scheme (e.g., quadrature amplitude modulation). With OFDM, different subcarriers are allocated to different mobile devices, which allows several mobile devices to share the available bandwidth. OFDM is deployed or planned for a variety of wireless systems, including IEEE 802.16 (WiMAX), some IEEE 802.11a/g wireless LANs (Wi-Fi), IEEE 802.20 Mobile Broadband Wireless Access (MBWA), and the like.

A practical implementation of an OFDM transmitter presents data symbol values associated with different subcarrier frequencies of a digital input data block, referred to herein as digital frequency-domain samples, to different frequency-domain inputs of an Inverse Discrete Fourier Transform (IDFT) processor to generate a time-domain representation of the desired transmission waveform, referred to herein as a modulated multi-frequency signal stream. The modulated multi-frequency signal stream is converted to an analog stream of modulated symbols. After upconversion and amplification, the resulting analog transmission signal is wirelessly transmitted to a remote device.

OFDM transmitters may be used in networks that employ frequency-scheduling algorithms to accommodate other mobile devices in a spectrum underutilized by a first mobile device. When sharing a spectrum between multiple mobile devices, it is important to minimize the leakage of transmitter energy into unallocated parts of the spectrum, so that a first mobile device's signal does not interfere with a second mobile device's signal, even when the first mobile device is much closer to a network station than the second mobile device.

Known techniques for minimizing energy leakage into unallocated parts of the available spectrum include filtering the signals using digital and/or analog filters. Such filters, however, may also introduce group delay and/or amplitude errors that lead to channel estimation errors at the receiver. For example, energy leakage into unallocated parts of the spectrum is a function of the tails of the transmitted spectrum and the transmitter noise floor. One source of spectral tails and noise floor is the quantizing noise and non-linearities of the digital-to-analog conversion process. Using analog filters that are as sharp as practically possible for the allocated spectrum after digital-to-analog conversion may minimize the noise. Unfortunately, sharp cut-off analog filters tend to exhibit group-delay distortion, whereby the phase versus frequency curve is non-linear. The group delay distortion causes errors in the channel estimation process implemented at the receiver. More particularly, OFDM receivers use pilot symbols having a known phase on selected OFDM subcarriers to estimate the channel. If a transmission filter applies group-delay distortion to the transmitted pilot symbols, the receiver channel estimation process produces a different result than would have been obtained with non-distorted pilot symbols. One solution to the group-delay distortion problem is to use an analog filter having a flat group delay across the allocated spectrum. However, analog filters designed for a flat group delay tend to have a non-flat amplitude over the allocated OFDM spectrum, which causes similar channel estimation problems at the receiver.

Receiver channel estimate errors may cause errors in transmitter operations as well as receiver operations. These errors occur when a transmitter uses channel estimates determined by a collocated receiver to estimate a future transmission channel, e.g., in multiple-input, multiple-output (MIMO) systems. For example, when the uplink and downlink signals use different frequencies, e.g., with Frequency Division Duplex (FDD) systems, other methods may be used to provide the transmitter with knowledge of the transmission propagation channel before transmission. U.S. Pat. No. 6,996,375 to applicant proposes one solution that loops back the received signal to the transmitter to enable the transmitter to figure out what the propagation path was. Other methods known as "rich feedback" have also been proposed. Further, U.S. patent application Ser. No. 12/478,564 discloses another method, where the channel observed at the receiver at one frequency is translated to the channel to be expected by the collocated transmitter at a different frequency. This method involves determining the number and parameters of a large number of scatterers in the environment by analyzing the received signal in the delay/Doppler domains. However, if the transmitted pilot symbols are distorted in phase and/or amplitude, the solution in the '564 application will give rise to phantom scatterers that are invalid for both the reception and transmission channel.

Even when the uplink and downlink signals use the same frequency, e.g., with Time Division Duplex (TDD) or ping-pong systems, reciprocity issues may further prevent the receiver from providing useful channel information to the transmitter for use on the same frequency. For example, a mobile device and a network station may be manufactured by different manufacturers. Thus, the uplink path includes the effects of a first manufacturer's transmission filter response, while the downlink path includes the effects of a second manufacturer's transmission filter response. Unless the combination of the first manufacturer's transmitter with the second manufacturer's receiver exhibits the exact same amplitude/phase versus frequency characteristics as the second manufacturer's transmitter combined with the first manufacturer's receiver, the channel will not be reciprocal.

Thus, there remains a need for an OFDM transmitter that addresses the group delay and/or amplitude errors introduced by one or more transmission filters across an allocated frequency spectrum.

SUMMARY

The present invention comprises a method and apparatus for reducing group delay and/or amplitude errors caused by one or more transmission filters. To that end, the present invention characterizes the errors of the transmission filters relative to a desired frequency response, in terms of an amplitude error vs. frequency response and a phase or group delay error vs. frequency response. A flat amplitude error response represents a constant amplitude error, while a linear phase error response represents a constant group delay. As used herein, a desired frequency response refers to a flat amplitude error response and a flat group delay response across the allocated spectrum, where the group delay is the derivative of the phase error response. Such a desired frequency response may be defined relative to a communication standard, or may be based on a predefined response agreed to by multiple base station manufacturers. Based on the errors, the present invention pre-compensates the digital frequency domain samples used to generate the transmission signal. In so doing, the present invention reduces the errors relative to the desired frequency response, e.g., group delay and/or amplitude errors, in the filtered transmission signal without placing limits on the specific filter designs.

In one embodiment, a wireless transceiver comprises a modulator, one or more filters, and a pre-compensation unit. The modulator modulates the digital frequency domain samples in an allocated spectrum to generate a modulated multi-frequency signal stream. The filters filter the modulated multi-frequency signal stream to suppress out-of-band spectral components. The filters collectively have a frequency-domain response over the allocated spectrum comprising a first maximum error relative to a desired frequency response. The pre-compensation unit pre-compensates one or more of the digital frequency-domain samples such that a collective frequency-domain response of the pre-compensation unit and the one or more filters comprises a second maximum error relative to the desired frequency response that is less than the first maximum error. It will be appreciated that the pre-compensation of the present invention may be used to pre-compensate for errors introduced by fixed, variable, analog, and/or digital filters operating at baseband and/or radio frequencies.

DETAILED DESCRIPTION

Figure 1:
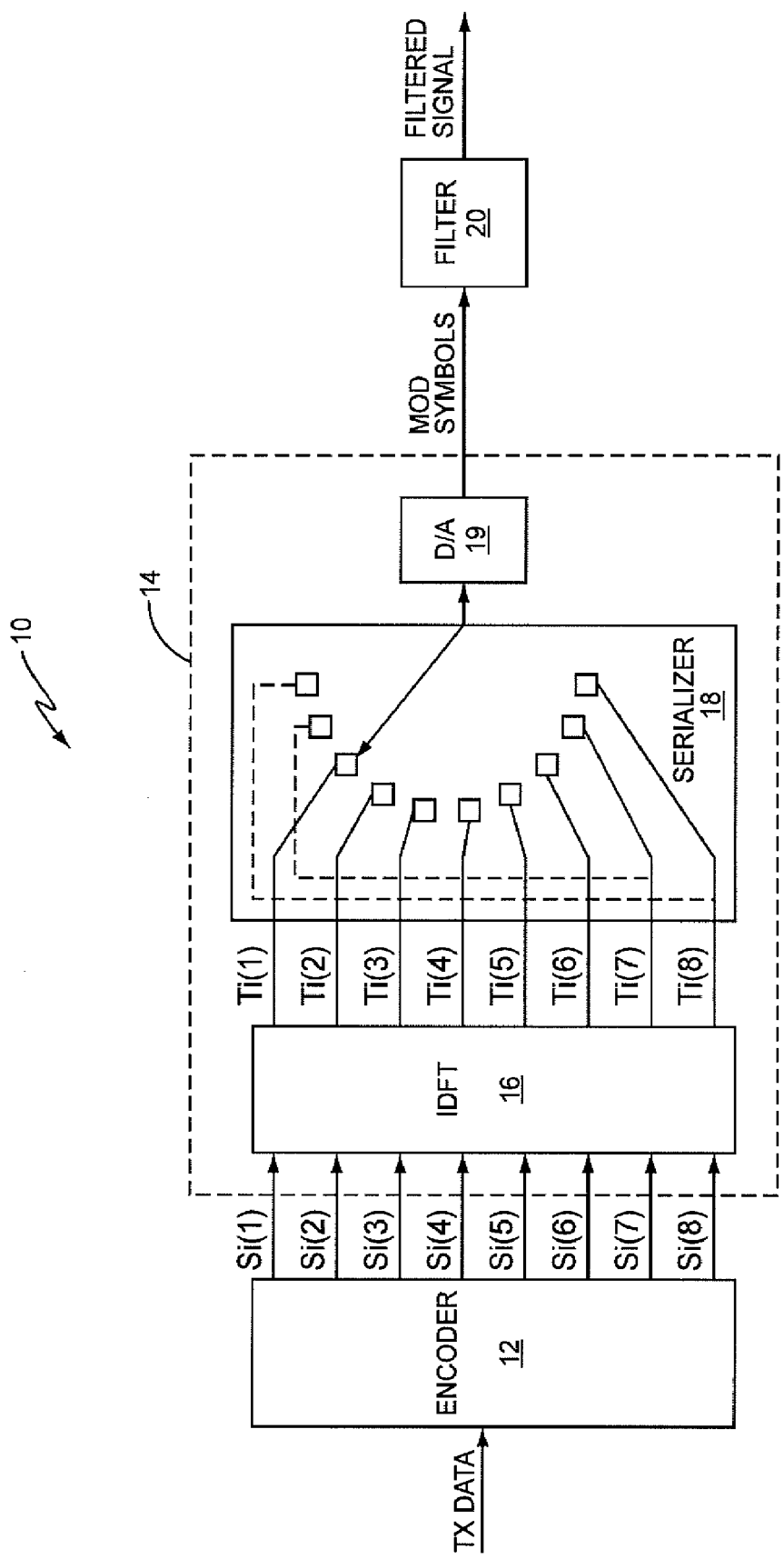
FIG. 1 shows a conventional OFDM transmitter.

The present invention reduces errors relative to a desired frequency response that are introduced to a transmission signal by one or more transmission filters. The errors may include group delay errors and/or amplitude errors across an allocated spectrum relative to a flat group delay and flat amplitude. As used herein, the term "group delay" refers to a phase derivative, and the term "flat group delay" refers to a constant group delay across the allocated spectrum resulting from a linear phase. Further, as used herein, the term "flat amplitude" refers to a constant amplitude across the allocated spectrum. Similarly, the term "group delay error" refers to the departure of the group delay from the flat group delay at any given frequency component in the allocated spectrum caused by phase nonlinearities, e.g., the departure of the phase from linear phase, while the term "amplitude error" refers to the departure of the amplitude at any given frequency component in the allocated spectrum from the flat amplitude.

The present invention comprises a wireless transceiver that generates a filtered analog transmission signal from digital frequency-domain samples in an allocated spectrum. The transceiver comprises one or more transmission filters that collectively have a frequency response comprising a specific group delay and amplitude for each frequency component in an allocated OFDM spectrum. A controller in the transceiver determines a difference between the group delay and amplitude of the collective frequency response and a desired frequency response comprising a flat group delay and flat amplitude, respectively. These differences represent the group delay errors and amplitude errors, respectively, applied to the transmission signal by the transmission filters. A pre-compensation unit in the transceiver reduces the group delay and amplitude errors by pre-compensating one or more of the digital frequency-domain samples based on the group delay and amplitude errors for the corresponding frequency component(s). In so doing, the present invention reduces the amplitude and group delay errors present in the transmission signal without limiting the transmission filter design options. It will be appreciated that the pre-compensation unit of the present invention may reduce the group delay and amplitude errors introduced into the transmission signal by both analog and digital transmission filters. Further, while the following describes the present invention in terms of amplitude and group delay pre-compensation, it will be appreciated that the present invention does not require pre-compensation of both the amplitude and group delay.

In OFDM systems, the departures of the transmitter phase or group delay versus frequency curve from linear or flat, respectively, may not adversely impact the channel estimation process so long as the receiver knows the transmission filter characteristics. When the receiver knows the transmission filter characteristics, the receiver can perform the compensation. In such systems, the transmitter phase and/or amplitude response could be specified by a standard applicable to all transmitters, and the receivers could assume that each transmitter met the standard. In this scenario, the departure of the transmission filter characteristics from the specified standard is the important error that impacts system performance. Therefore, an alternative definition of the error that the invention seeks to reduce is the an error based on the departure of the phase/group delay and/or amplitude characteristics versus frequency from the specified standard values of the transmission filters.

To facilitate the detailed description of the present invention, FIG. 1 first shows a conventional OFDM transmitter 10 comprising an encoder 12, OFDM modulator 14, and filter 20. Encoder 12 encodes transmission data to produce an input data block of complex information-bearing frequency-domain samples, $S_i(1), S_i(2), \ldots, S_i(8)$, which, for example, may comprise 16-QAM symbol values. Modulator 14 modulates the samples in the input data block to generate a modulated multi-frequency signal stream. Modulator 14 comprises an inverse discrete Fourier transform (IDFT) unit 16, a serializing unit 18, and a digital-to-analog converter 19. IDFT unit 16 transforms the digital frequency-domain values of the input data block to generate a time waveform comprising a block of time-domain samples $T_i(1), T_i(2), \ldots, T_i(8)$. Serializing unit 18 sequentially selects the IDFT output samples to convert the IDFT output samples to a digital multi-frequency signal stream, and subsequently to produce the analog stream of modulated symbols, referred to herein as an analog OFDM signal. Digital-to-analog converter 19 converts the digital sample stream to the analog OFDM signal. Filter 20 filters the analog OFDM signal to produce a filtered signal comprising complex symbols. The filtered signal is further upconverted, filtered, and amplified to generate the analog transmission signal.

While not required, serializing unit 18 may repeat some of the first samples at the end to include a cyclic prefix/postfix in the modulated symbol stream, as shown in FIG. 1. Such cyclic prefixes/postfixes ensure that a whole block of samples are received even if there is a small timing error not greater than the length of the cyclic prefix. As such, a cyclic prefix and/or postfix renders OFDM transmissions relatively insensitive to time delay spread. The cyclic prefix samples may be tapered smoothly to zero away from the main sample block in some implementations known as pulse-shaped OFDM, which are more fully described in U.S. patent application Ser. Nos. 12/126,576 and 12/045,157 to Applicant Dent.

Figure 2A:
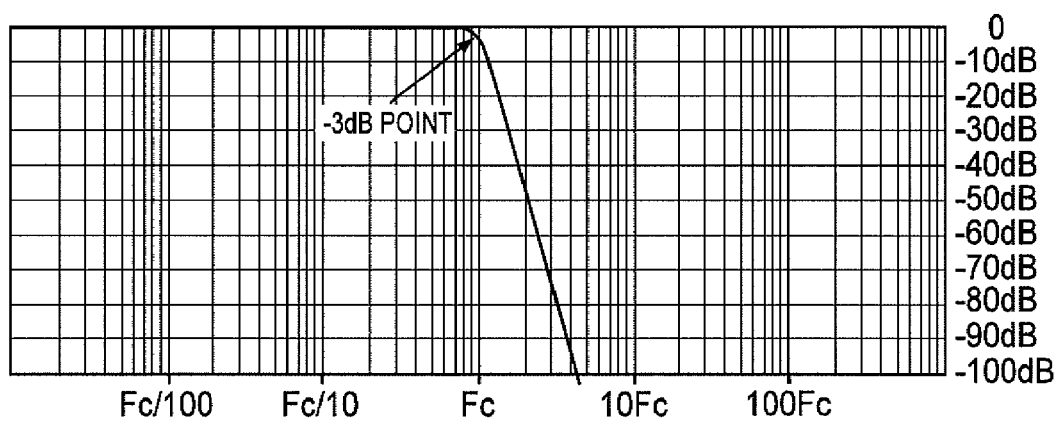
FIGS. 2A and 2B show an exemplary analog filter response.
Figure 2B:
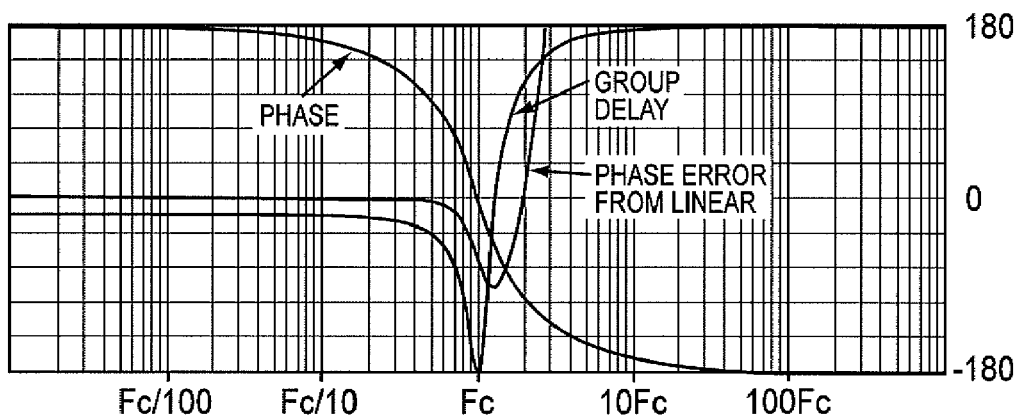

The frequency response of filter 20 determines how well the out-of-band spectral components are suppressed. FIGS. 2A and 2B show exemplary amplitude and phase frequency responses that result when filter 20 comprises an $8^{th}$ order Butterworth (Maximally flat) filter that provides about 48 dB attenuation one octave away from its −3 dB point. When the IDFT unit 16 comprises a 50% over dimensioned IDFT unit, there is one octave from the highest wanted frequency to the lowest unwanted frequency of the first alias. Thus, a filter 20 having at least the complexity of the $8^{th}$ order filter shown in FIGS. 2A and 2B is required to adequately suppress the alias.

Figure 3:
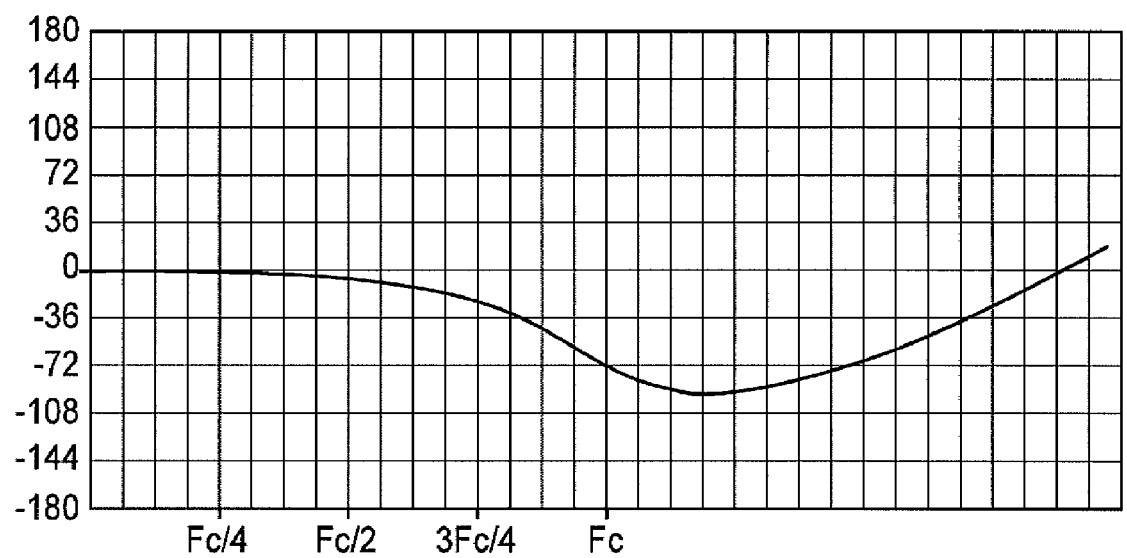
FIG. 3 shows the phase error vs. linear frequency for the analog filter response of FIGS. 2A and 2B.

FIG. 2B plots the phase, group delay, and phase departure from linear phase for the $8^{th}$ order Butterworth filter. The latter is the most relevant, and shows that, at the −3 dB cutoff point ($F_c$), the magnitude of the phase departure from linear phase is nearly 70°. Plotting this phase error on a linear scale of frequency, as shown in FIG. 3, gives a better appreciation of the proportion of OFDM subcarriers affected by this group delay error. It may be seen that the group delay error starts to become significant, e.g., in the 5° region, at $F_c/2$, one octave below the −3 dB cutoff frequency, and rises to about 20° at $3F_c/4$, and about 70° at $F_c$. Thus, in this example, about half of the allocated spectrum, and thus about half the pilot symbols, will be transmitted with phases other than those expected. This causes the problems discussed above, such as phase distortion and non-reciprocity of the uplink and downlink directions, even in the single-frequency TDD case.

One way to address these problems is to over dimension the IDFT 16 more than done for conventional systems. For example, conventional OFDM systems may over dimension the IDFT 16 by 50% to effectively over sample the time waveform $T_i(1), T_i(2), \ldots, T_i(8)$, e.g., provide a sample rate greater than the Nyquist rate for the desired bandwidth of the input data block. Oversampling the time waveform causes quantizing noise due to finite digital word lengths and arithmetic accuracy to be spread over a larger bandwidth, and therefore, reduces its spectral density. Thus, an over dimensioned IDFT unit 16 distances unwanted spectral aliases from the wanted spectrum. Over dimensioning the IDFT 16 even further helps reduce the above-discussed phase distortion and non-reciprocity problems. However, because conventional solutions already use 1.5:1 over dimensioning, further over dimensioning would require a further factor of two, thus indicating 3:1 over dimensioning. This is not a practical solution, however, because the IDFT already provides designers with power and size challenges, and the further increases in power consumption and chip area associated with further over dimensioning are to be avoided.

Another solution uses digital filters that have a more linear phase characteristic than the Butterworth filter. However, such digital filters would have to be an up-sampling filter that produced by interpolation a higher output sampling rate than input sampling rate. Otherwise the alias frequency is no further removed and the subsequent analog filter has the same specification as before. Interpolation to a higher sampling rate, however, requires a high order of interpolation in order to avoid introducing spectral artifacts. Because an over dimensioned IDFT is a perfectly artifact-free interpolator, considering a digital filter merely leads one back to further over dimensioning the IDFT.

Figure 4A:
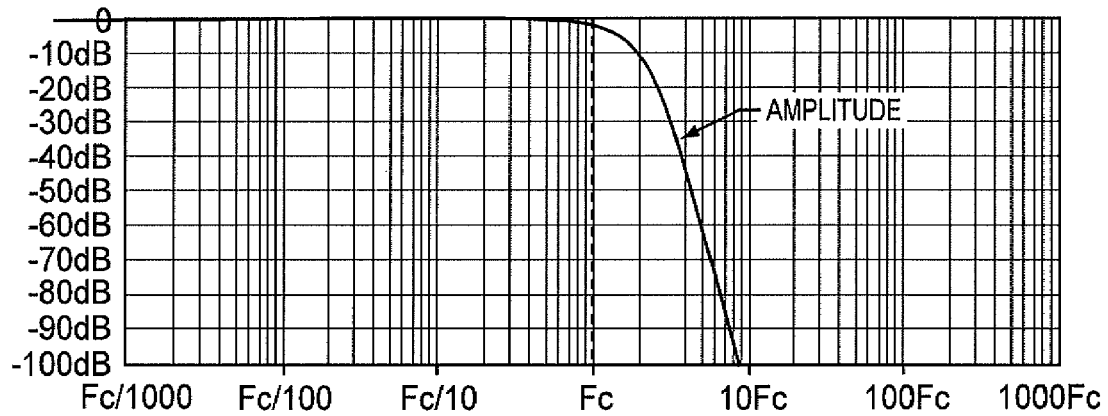
FIGS. 4A and 4B show another exemplary analog filter response.
Figure 4B:
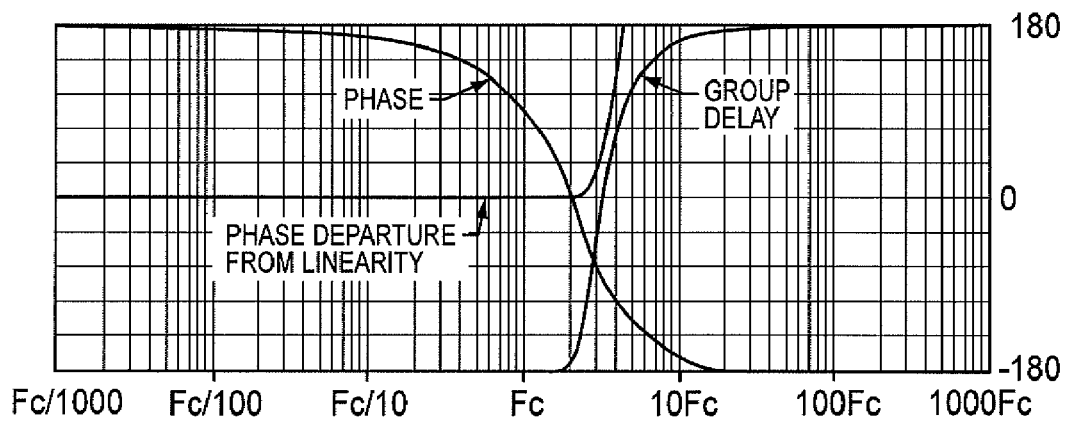

An alternative, more linear-phase analog filter, e.g., an analog Bessel filter, might also be considered. However, like all filters that employ the available degrees of freedom to optimize phase or group delay characteristics, the penalty of the Bessel filter is that the sharpness of cut-off is sacrificed. For example, an $8^{th}$ order Bessel filter takes two octaves to fall from −3 dB to −50 dB, as shown in FIG. 4A instead of the Butterworth's one octave. Further, FIG. 4A shows that the Bessel filter's band-edge attenuation is 12 dB one octave lower then the −50 dB point. Thus, while the Bessel filter helps address the phase distortion problem, as shown by FIG. 4B, about half the OFDM subcarriers approaching the band edge suffer significant amplitude reductions between −3 dB and −12 dB.

The present invention provides an alternative solution that reduces the phase and amplitude errors and problems associated therewith, without requiring further over dimensioning of the IDFT 16 or the utilization of less desirable filter solutions. More particularly, the present invention generates a filtered analog transmission signal having multiple frequency components from digital frequency-domain samples. To reduce the group delay and/or amplitude errors introduced by one or more transmission filters, the present invention pre-compensates one or more of the frequency-domain samples such that the collective frequency response of the pre-compensation unit and the transmission filters has a group delay error and/or amplitude error relative to a flat group delay and flat amplitude, respectively, that is less than the corresponding group delay and/or amplitude error of the filters alone.

Figure 5:
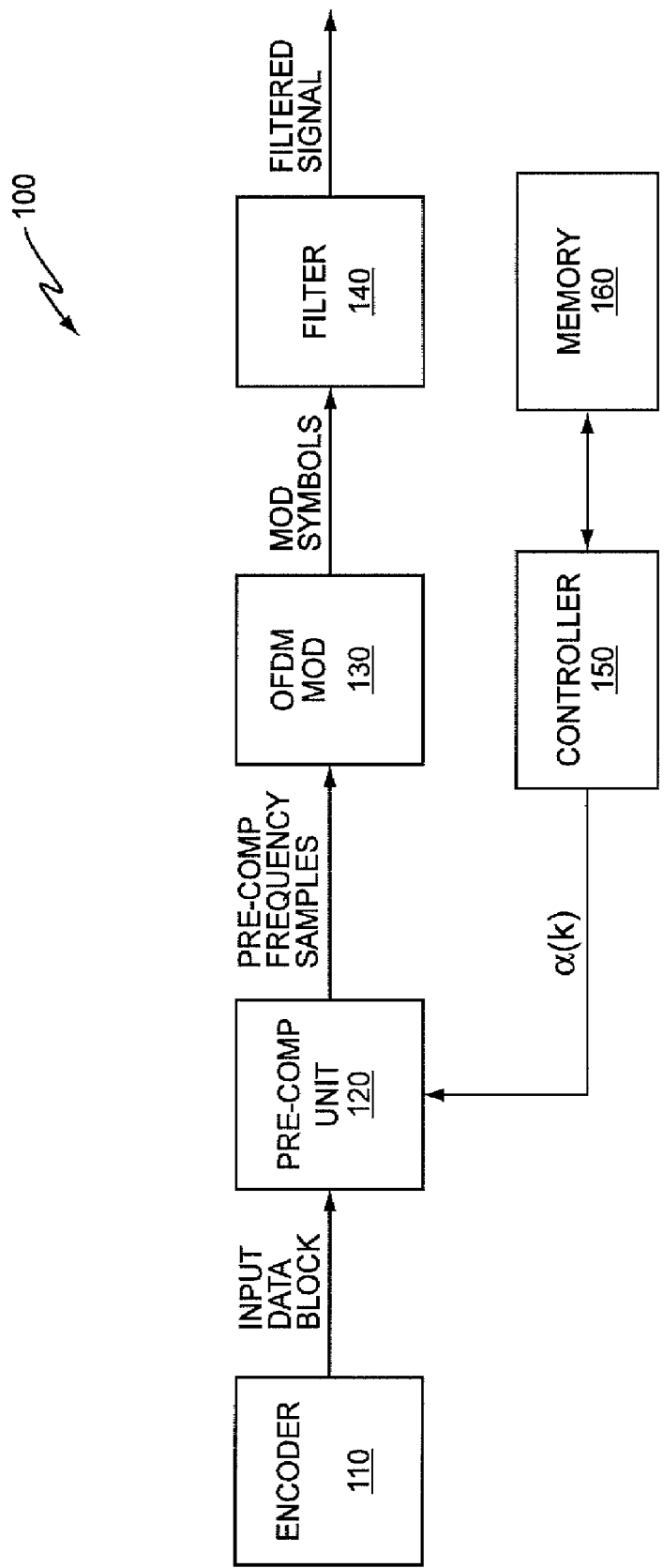
FIG. 5 shows an OFDM transmitter according to one exemplary embodiment of the present invention.

FIG. 5 shows an exemplary OFDM transmitter 100 according to the present invention. OFDM transmitter 100 comprises an encoder 110, pre-compensation unit 120, OFDM modulator 130, filter 140, controller 150, and memory 160. While the following describes the present invention in terms of an OFDM transmitter 100 and OFDM components, it will be appreciated that the present invention applies to any transmitter that generates a transmission signal with multiple frequency components.

Encoder 110 encodes transmission data using any known encoding technique to generate an input data block comprising a frequency domain sample $S_i(k)$ for each subcarrier frequency in an allocated spectrum, where i and k index the data block and frequency subcarrier, respectively. Pre-compensation unit 120 pre-compensates the frequency domain samples as described further below to generate pre-compensated frequency-domain samples $S_i'(k)$. OFDM modulator 130 modulates the pre-compensated frequency domain samples to generate a modulated multi-frequency signal stream. Filter 140 limits unwanted spectral components from the multi-frequency signal stream. Additional transmission path components (e.g., see FIG. 9) upconvert, filter, and amplify the filtered signal to generate the filtered analog transmission signal.

Figure 6:
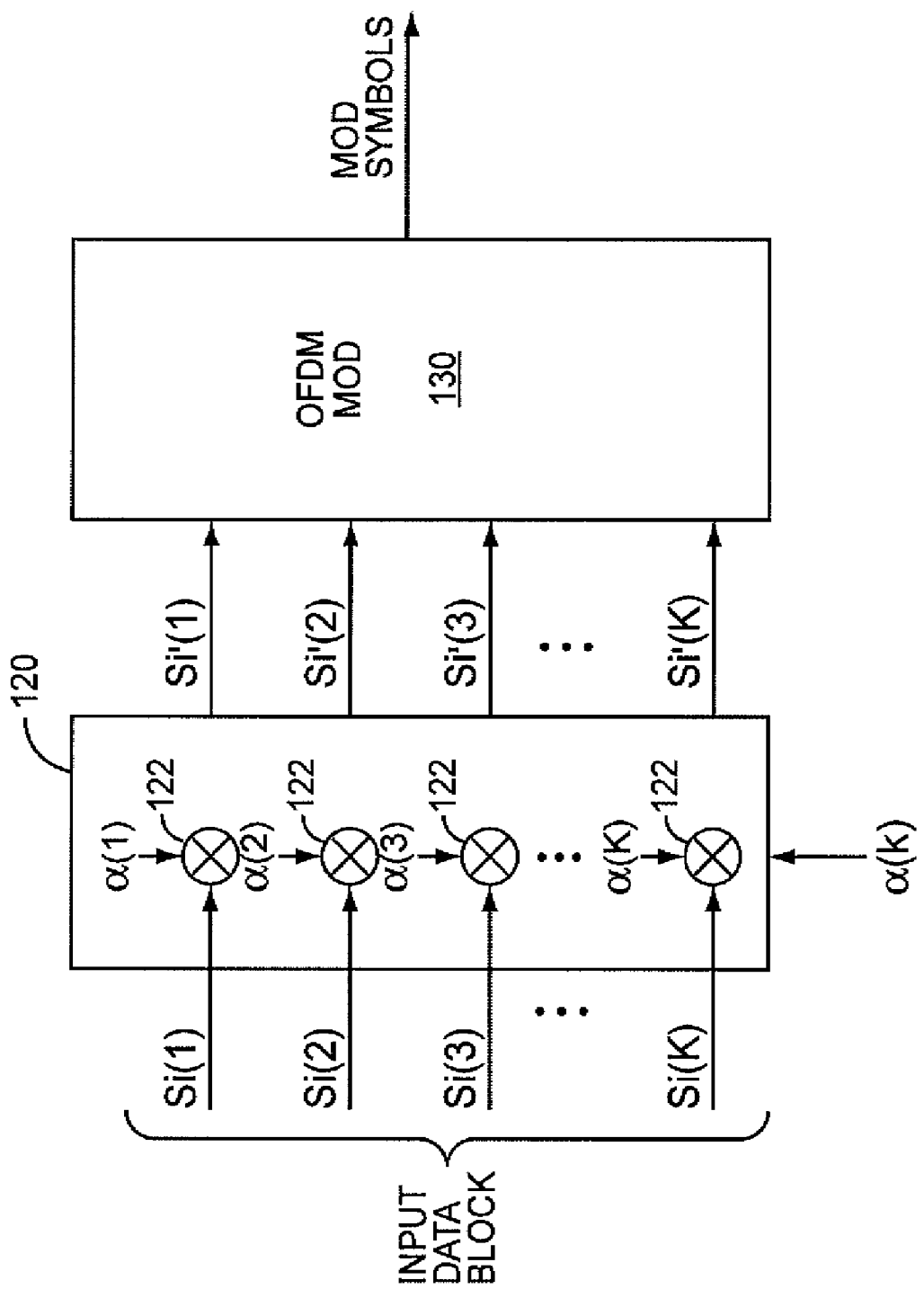
FIG. 6 shows an exemplary pre-compensation unit for the OFDM transmitter of FIG. 5.

FIG. 6 shows one exemplary pre-compensation unit 120 comprising a plurality of complex multipliers 122 that pre-compensate the digital frequency-domain samples by multiplying the frequency-domain samples $S_i(k)$ with a frequency-specific complex pre-compensation factor $\alpha(k)$ provided by the controller 150. Pre-compensation factors $\alpha(k)$ for a wide variety of filters and/or frequency subcarriers may be determined in advance, and stored in memory 160, e.g., in look-up tables. Alternatively, controller 150 may determine the pre-compensation factors $\alpha(k)$ as needed in real time.

In one exemplary embodiment, the pre-compensation factors $\alpha(k)$ are determined based on a difference between a desired frequency response and the actual frequency response of filter 140. For example, $\alpha(k)$ may be determined according to:

$$\alpha(k) = \frac{F_d(k)}{F_a(k)}, \quad (1)$$

where $F_d(k)$ is a complex quality that represents the desired frequency response at the $k^{th}$ subcarrier frequency, and $F_a(k)$ represents the actual frequency response at the $k^{th}$ subcarrier frequency. The desired frequency response comprises a flat group delay and a flat amplitude across the allocated spectrum, where flat group delay and flat amplitude are as defined above. The actual frequency response comprises the actual group delay and amplitude of filter 140 at each frequency component of the allocated spectrum.

By multiplying the frequency-domain samples $S_i(k)$ by the corresponding pre-compensation factors $\alpha(k)$, the pre-compensation unit 120 pre-compensates the input data block for the frequency-specific group delay and/or amplitude errors, e.g., the phase distortion shown in FIG. 3, introduced to the transmission signal by one or more of the filters. In so doing, the pre-compensation unit 120 reduces the group delay and amplitude errors of the filtered analog transmission signal ultimately transmitted by transmitter 100. While pre-compensation unit 120 includes a multiplier 122 for each frequency component of the allocated spectrum, the present invention does not require the pre-compensation unit 120 to pre-compensate each input frequency domain sample. Instead, pre-compensation unit 120 may be configured to pre-compensate only those input samples corresponding to frequency components having a group delay and/or amplitude error that exceeds some preset maximum error. For example, when a filter 140 has a frequency response with a maximum group delay error (e.g., 70° at $F_c$ as in FIG. 3), the pre-compensation unit 120 may be configured to pre-compensate only those frequency domain samples associated with frequency components having a group delay error greater than a predetermined threshold, e.g., 5°, such that the collective frequency response of the pre-compensation unit 120 and the filter 140 has a maximum group delay error across the allocated spectrum less than the maximum group delay error introduced by the filter alone, e.g., <70°. In one exemplary embodiment, the results of the pre-compensation significantly reduce the group delay and amplitude errors to below a predetermined threshold, e.g., reduce the group delay error to less than 5°. In the example of FIG. 3, the frequency domain samples associated with the frequency components between $F_c/2$ and $F_c$ would be pre-compensated, while the frequency components between 0 and $F_c/2$ would not be pre-compensated.

It will also be appreciated that the pre-compensation unit 120 of the present invention may pre-compensate for group delay and amplitude errors introduced by both baseband and RF filters. The frequency response across the allocated OFDM spectrum caused by RF filters, such as transmit/receive duplex filters, will depend on the absolute RF center frequency of the transmitter, which may be fixed or variable, while the frequency response caused by baseband filters depends only on the relative location of an OFDM subcarrier frequency relative to the center of the allocated OFDM spectrum. To address the amplitude and group delay errors introduced by multiple transmission filters, the pre-compensation unit 120 may multiply one or more digital input frequency-domain samples by a single pre-compensation factor that collectively represents the pre-compensation for all baseband and RF filters, which are obtained by combining the absolute frequency-dependent values with relative frequency-dependent values. Alternatively, pre-compensation unit 120 may multiply one or more digital frequency-domain samples of the input data block by multiple pre-compensation factors, e.g., one for each filter, or one that collectively represents all baseband filters (e.g., relative frequency-dependent values) and one that collectively represents all RE filters (e.g., absolute frequency-dependent values).

Figure 7:
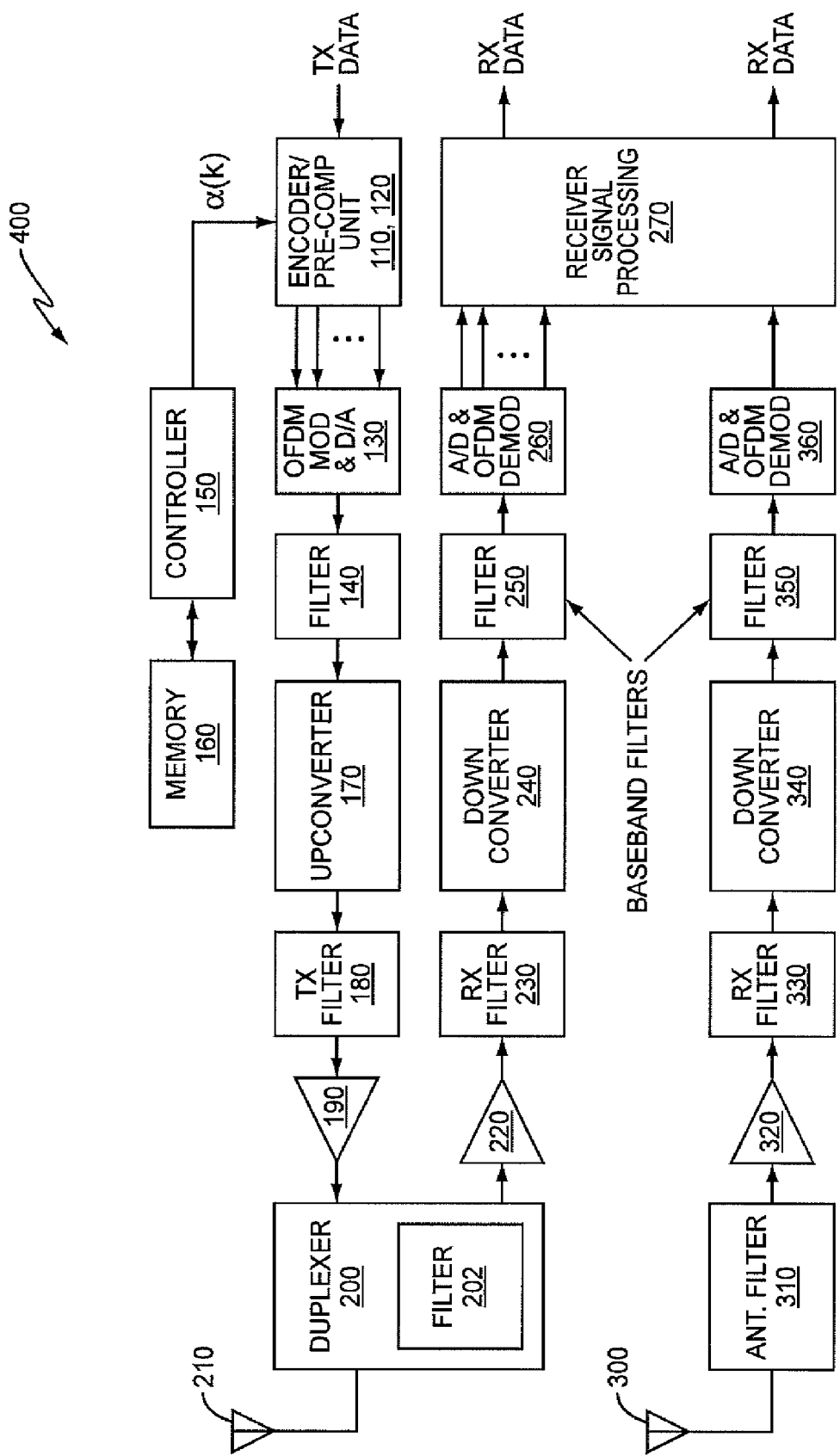
FIG. 7 shows an exemplary transceiver according to one embodiment of the present invention.

For example, pre-compensation unit 120 may pre-compensate the frequency-domain samples for each filter in the transmission chain of the mobile device 400 shown in FIG. 7. The exemplary mobile device 400 comprises one transmit antenna 210 and two receive antennas 210, 300, one of which duals as the transmit antenna 210. The transmission chain includes the encoder 110, pre-compensation unit 120, OFDM modulator 130, filter 140, controller 150, and memory shown in FIG. 5, as well as an upconverter 170, RF transmission filter 180, and amplifier 190. Upconverter 170 upconverts the filtered modulated symbols to a desired radio frequency (RF). RF transmission filter 180 filters the upconverted signal, while amplifier 190 amplifies the filtered signal to a desired transmission power level. Both reception chains include an amplifier 220, 320, RF reception filter 230, 330, downconverter 240, 340, filter 250, 350, analog-to-digital converter/OFDM demodulator 260, 360, and receiver signal processor 270.

The transmitter chain and one of the receiver chains share the common antenna 210 by means of the duplexer 200. When the transmit and receive frequency bands are different, e.g., for FDD, duplexer 200 may comprise a filter system 202 that includes a transmit filter passing the transmission frequencies and a receive filter passing the reception frequencies. Alternatively, when the transmit and receive frequency bands are the same, e.g., for TDD, duplexer 200 may comprise a transmit/receive switch with a common filter 202. It will be appreciated that the entire transmit/receive chain may be repeated using the second antenna 300 in order to construct a mobile communications device having two transmit and two receive antennas. If both antennas are used for transmission, a receiving base station can characterize the transmission channel for each antenna by analyzing the received signals. In the case where two transmitter chains are used with respective transmit antennas 210, a pre-compensation 120 may be used in each chain to ensure that the relative phases and/or amplitudes of the filtered analog transmission signals fed to the two antennas 210 meets the desired frequency response. Alternatively, if it is desired to utilize only a single transmit IDFT unit, and the two transmission signals are obtained by splitting the IDFT output between two antennas 210, then a single pre-compensation unit 120 may be used to compensate for the single set of baseband filters 140 and for the mean of the two RF filter chains 180, 202.

As shown in FIG. 7, the transmission channel includes baseband filter 140, RF transmission filter 180, duplexer filter 202 (also at RF), and the propagation channel. For downlink MIMO operation, a remote receiver would like to know in advance the propagation channels for each receiver in the mobile communication device. A downlink channel includes the propagation channel, the receiving part of duplexer 200, RF receiving filter 230, and baseband filter 250. Thus, even if same-frequency TDD operation is assumed, such that the transmission and reception propagation channels are generally the same, the total transmission channel and reception channel differ due to the difference between receive filters 202, 230, 250 and transmit filters 140, 180, 202. It can be assumed that a receiver can determine its own receive filter characteristics, including mismatch between the two receiver chains. However, the receiver cannot determine the transmit filter characteristics of the transmission channel. Therefore, it is desirable that the transmitter should compensate its own transmission for the group delay and amplitude errors of its own transmit filter(s) so that the analog transmission signal conforms to a desired frequency response. As mentioned above, the desired frequency response may comprise a flat amplitude and group delay. Alternatively, the desired frequency response may be a specified amplitude/group delay characteristic verses frequency described in a standards document.

In the above description, it has already been shown how the characteristics of a baseband transmit filter, such as filter 140, may be accounted for by a pre-compensation of the phase and/or amplitude of each OFDM subcarrier by means of complex pre-compensation factors. The same technique can be used to compensate for the characteristics of RF transmission filters, e.g., filters 180 and 202. However, the OFDM signal may be positioned at different places within a total transmission frequency band allocated to the communications service, which band is defined by the filters 180, 202. Therefore, unlike the pre-compensation for baseband filters 140, the pre-compensation for bandpass filters 180, 202 will depend on the positioning of the OFDM signal within the total transmission frequency band. It is assumed that the positioning is adjustable in steps of the OFDM subcarrier width, so that the possible frequencies upon which each subcarrier may be positioned form a grid. For example, if the total transmit band allocated is 60 MHz wide, and the OFDM subcarrier spacing is 10 KHz, there are 6000 possible frequencies on which a subcarrier may be transmitted. It is proposed that the RF transmission path, including RF transmission filter 180, duplexer filter 202, and any other frequency selective components after the upconverter 170 be characterized in phase and amplitude relative to the desired frequency response at each of these potential 6000 frequencies as described above to determine the corresponding pre-compensation factors. The total compensation to be applied to each frequency-domain sample at the input of the OFDM modulator 130 would then comprise a compensation value for the baseband filter 140 selected according only to the subcarrier index k at the input of the OFDM modulator 130, and one or more compensation values for the RE components, e.g., filters 180 and 202, selected from a second table of the above-mentioned 6000 values in dependence on the subcarrier index k and a channel index m, where the channel index m indicates the positioning of the OFDM signal within the total transmission band.

Figure 8:
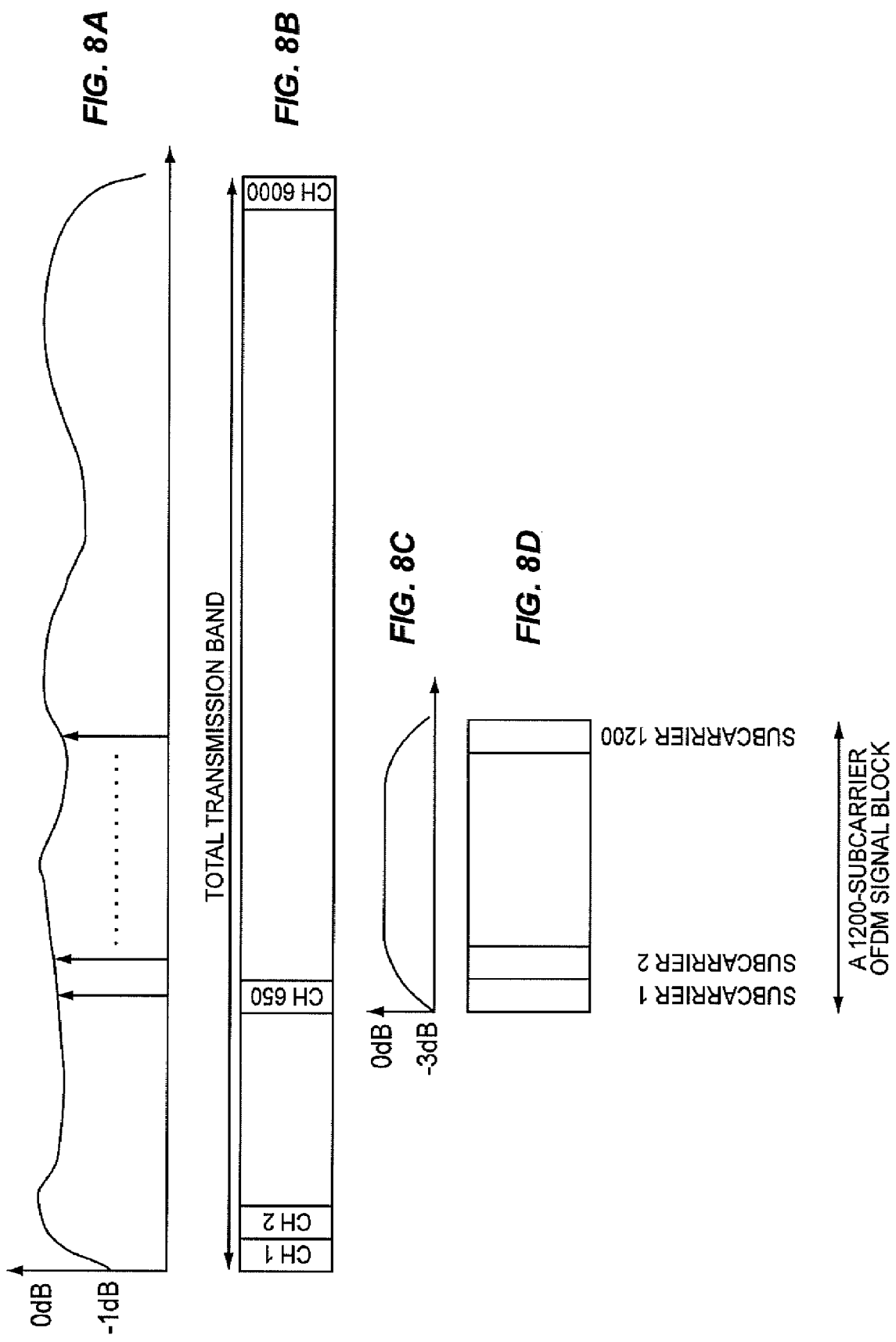
FIGS. 8A-8D show exemplary OFDM signals.

FIGS. 8A-8D show the positioning of an OFDM signal within a total transmission frequency band that is 6000 subchannels wide. FIG. 8A shows a collective frequency response across the transmission band for RF transmission filter 180 and duplexer filter 202 and any other components in the RF path having non-constant frequency characteristics. An input data block of 1200 frequency-domain samples, shown in FIG. 8D, is positioned for transmission with subcarrier index 1 located at transmit band subchannel number 650. Moreover, filter 140 exhibits a baseband frequency response shown in FIG. 8C across the OFDM block. The latter may be compensated by multiplying frequency-domain samples $S_i(k)$ with a corresponding baseband pre-compensation factor $\alpha(k)$, which may be selected from a first compensation look-up table stored in memory 160. Then the frequency response of the RF components may be pre-compensated by further multiplying the frequency-domain sample by an RF pre-compensation factor $\beta(k+m)$, where m is the subchannel number where subcarrier 1 is positioned, e.g., m=650 in FIGS. 8A-8D. The RF pre-compensation factor is determined in a manner similar to that of the baseband pre-compensation factor, e.g., based on the difference between the desired frequency response and the collective frequency response of the RF components across the transmission band. Thus, the pre-compensated frequency-domain samples become:

$$S_i'(k)=\beta(k+m)\cdot\alpha(k)\cdot S_i(k), \quad (2)$$

where the appropriate choice of the pre-compensation factors $\alpha(k)$ and $\beta(k+m)$ are the reciprocals of the respective frequency response errors they compensate for. While the RF pre-compensation factor collectively represents the pre-compensation factor for the RE components, it will be appreciated that separate pre-compensation factors for individual RF components may be used. Further, it will be appreciated that the baseband and RF pre-compensation factors may be combined to form composite pre-compensation factors that are subsequently applied to the corresponding frequency-domain samples. It will also be appreciated that numbering OFDM subchannels starting at 1 is arbitrary; the numbering could equally well start at 0 or be distributed between negative and positive indices relative to a center subchannel of zero. Likewise the RF subcarriers within the transmit band are numbered 1 to 6000, which is also an arbitrary convention. Depending on the convention, the address to the look-up table for the RF pre-compensation factors may be modified by a constant to generate the correct address in memory for the correct pre-compensation factor.

The digital frequency-domain pre-compensation of the present invention may also be used in transmitters that allow a variable number of subcarrier frequencies for an input data block, where K represents the number of subcarrier frequencies selected based on a desired data rate. For example, an OFDM symbol is defined as the waveform block produced by the OFDM modulator 130 corresponding to a given set of input values in the input data block. One OFDM waveform block is transmitted in a fixed period called an OFDM symbol period. In the OFDM symbol period, therefore, a number of data symbols are transmitted corresponding to the number of input values that were presented in the input data block at the input of the OFDM modulator 130. Thus, the transmitted data rate is equal to N data symbols per OFDM symbol period, and the data rate may therefore be increased by increasing N, e.g., by using more of the OFDM input subcarrier slots for data symbols. Controller 150 may thus allocate a large number of subcarrier frequencies to mobile devices having a high data rate, or a small number of subcarrier frequencies to mobile devices having a low data rate.

Figure 9:
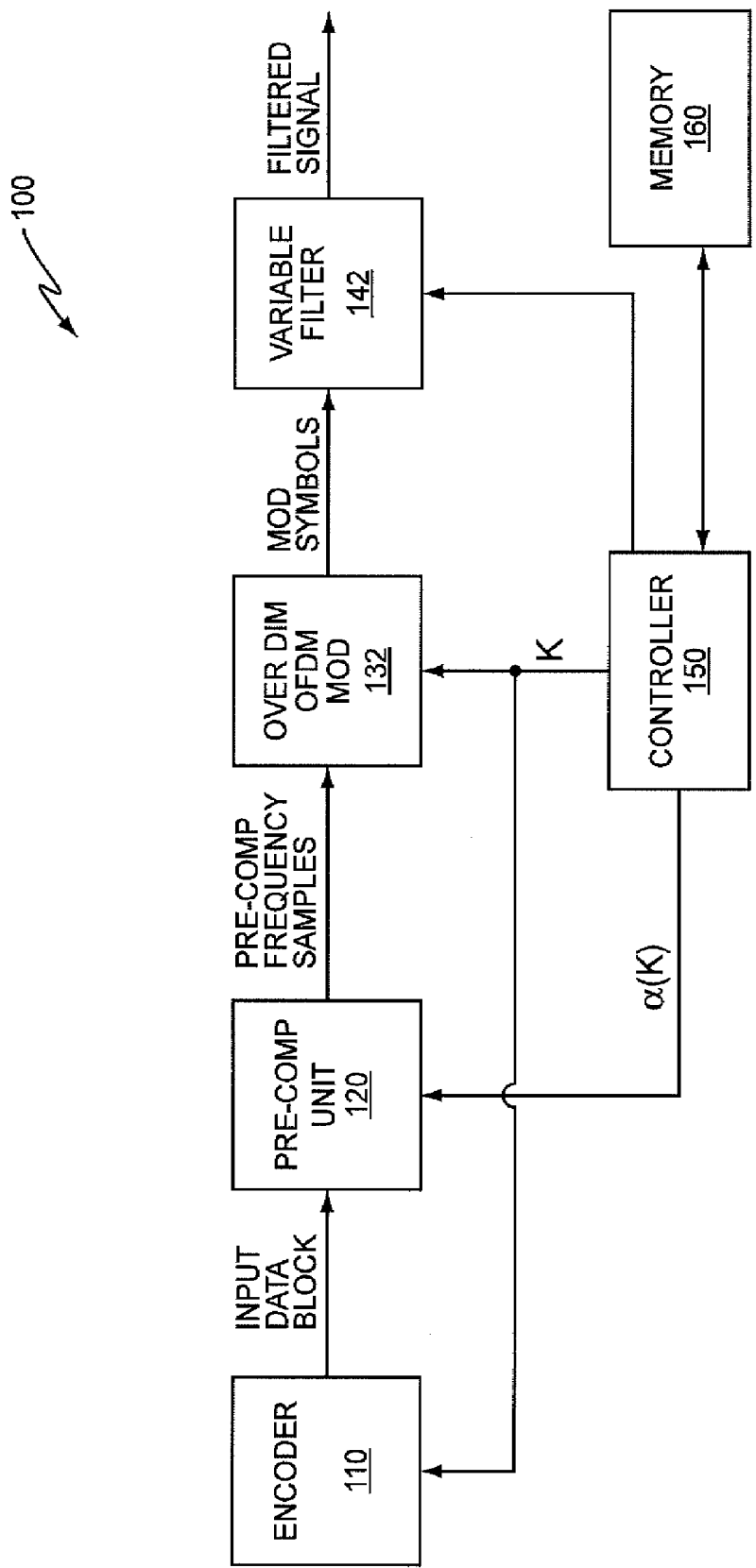
FIG. 9 shows an exemplary OFDM transmitter according to another exemplary embodiment of the present invention.

To accommodate the variable data rate feature, the OFDM modulator 130 and variable filter 140 in OFDM transmitter 100 may comprise an over dimensioned OFDM modulator 132 and a variable filter 142, respectively, as shown in FIG. 9 and described in detail in U.S. patent application Ser. No. 12/541,426 to present applicants. The over dimensioned OFDM modulator 132 is configured to have a size that exceeds the number of subcarrier frequencies selected for an input data block. As used herein, the size of OFDM modulator 132 generally corresponds to the size of a frequency transform unit in OFDM modulator 132, e.g., the over-dimensioned transform unit 136 shown in FIG. 10. When transmitter 100 uses less than the full bandwidth, the unused subcarrier frequencies may contain energy at an undesirably high level that interferes with other services using the same spectrum. Such unwanted energy arises from digital quantizing noise and thermal noise in oscillators, modulators, and amplifiers. To address this problem, the controller 150 in this embodiment configures one or more properties of variable filter 142 based on the selected number K of subcarrier frequencies in addition to providing the pre-compensation factors $\alpha(k)$ to the pre-compensation unit 120. For example, controller 150 may configure the cutoff frequency for filter 142 based on the selected number K of subcarrier frequencies. It will be appreciated that filter 142 may be configured to have a bandwidth that is either continuously or stepwise variable. Alternatively, variable filter 142 may be configured by selecting an anti-aliasing filter having the desired configuration from a number of pre-determined anti-aliasing filters available to transmitter 100.

Figure 10:
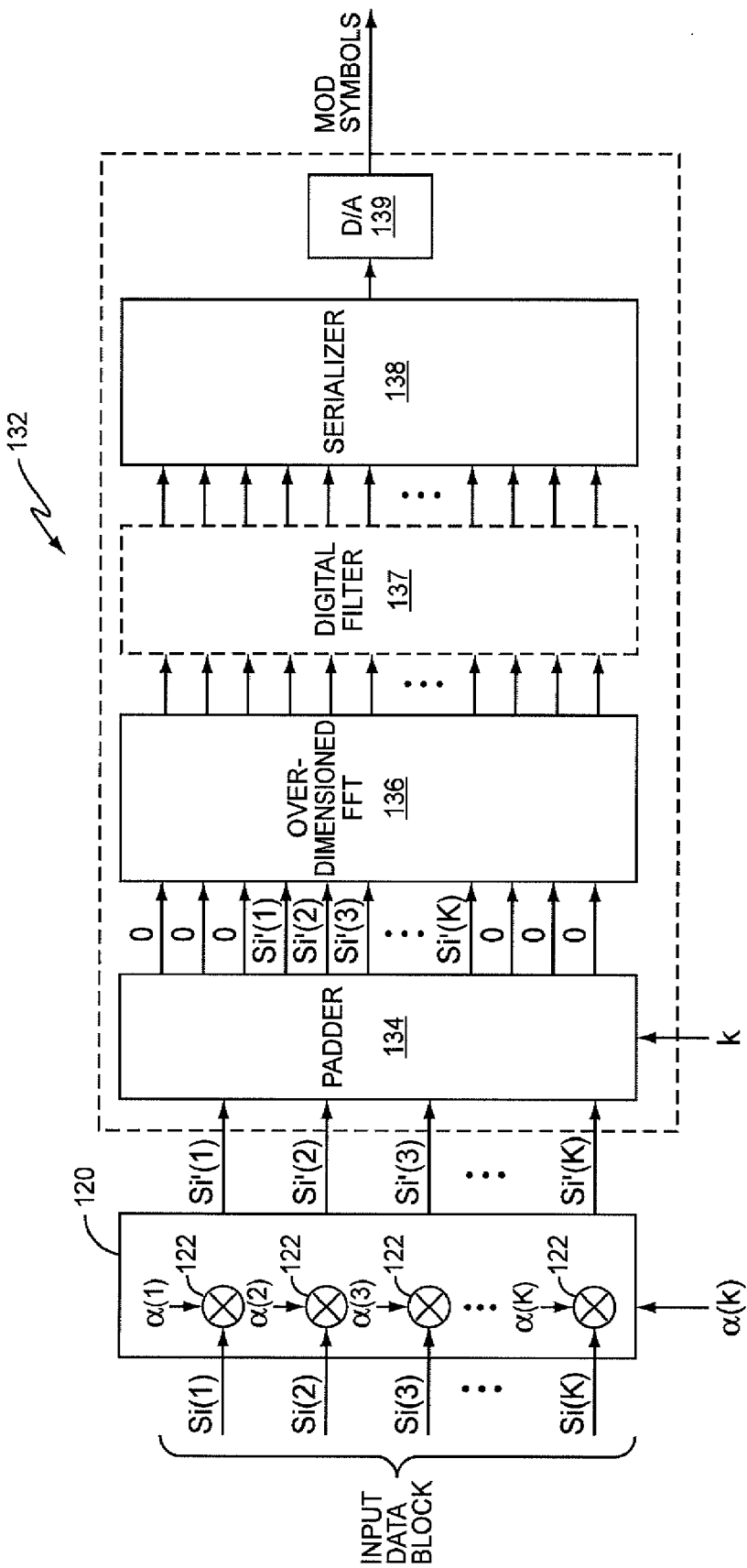
FIG. 10 shows an exemplary pre-compensation unit and OFDM modulator for the OFDM transmitter of FIG. 9.

FIG. 10 shows details of an exemplary pre-compensation unit 120 and OFDM modulator 132 for the transmitter 100 of FIG. 9. The $i^{th}$ input data block comprises K frequency-domain samples $S_i(1), \ldots, S_i(K)$ corresponding to the K subcarrier frequencies selected by the controller 150 based on the desired data rate. Controller 150 obtains one or more complex pre-compensation factors, e.g., $\alpha(k)$ and $\beta(k+m)$, for the frequency-domain samples, as discussed further below, and provides them to the pre-compensation unit 120. Multipliers 122 in pre-compensation unit 120 multiply the frequency-domain samples of the input data block by the corresponding complex pre-compensation factor(s) provided by controller 150. The pre-compensated data block $S_i'$ is input to the OFDM modulator 132.

The over-dimensioned OFDM modulator 132 comprises a padding unit 134, an over dimensioned transform unit 136, e.g., an over dimensioned Fourier transform unit, and a serializing unit 138. Padding unit 134 adds null values to either end of the pre-compensated input data block, where the null values represent subcarrier frequency values in which no energy should fall, e.g., spectrum not allocated to the current transmission. To accommodate different sized input data blocks, padding unit 134 changes the number of bordering null values added to the input data block to maintain the same number of inputs into the over dimensioned transform unit 136. The number of bordering null values added by padding unit 134 is determined based on the number K of selected subcarrier frequencies, which is provided by controller 150. For example, reducing the number of wanted subcarriers leads to increasing the number of bordering null values to maintain the same array size input to the transform unit 136.

The input to the over dimensioned transform unit 136 comprises the expanded and pre-compensated data block. Over dimensioned transform unit 136 transforms the expanded and pre-compensated data block by converting the pre-compensated frequency-domain samples of the expanded data block to time domain samples according to any known means. Serializing unit 138 converts the digital time-domain samples output by transform unit 136 to a multi-frequency signal stream, and converts the stream of samples to an analog modulated OFDM signal. The analog modulated OFDM signal is provided to the variable filter 142.

The pre-compensation factors for fixed or variable filters 140, 142 may be determined using the same techniques described above. For example, the baseband pre-compensation factors may be determined based on the difference between the frequency response of variable filter 142 and the desired frequency response, e.g., one having a flat group delay and amplitude over the allocated spectrum. As with the fixed filter pre-compensation factors, controller 150 may determine pre-compensation factors for variable filters in real time. Alternatively, different sets of pre-compensation factors corresponding to different variable filter implementations may be stored in look-up tables in memory 160. In this case, controller 150 may retrieve the appropriate pre-compensation factors from memory 160 based on the configuration of variable filter 142. It will be appreciated that the same logic applies to any variable RF filters.

It will be appreciated that while not explicitly shown, the present invention may use a quadrature modulator and upconverter. For example, the waveform output by transform unit 136 may comprise a sequence of complex numbers having a real part I and an imaginary part Q. The sequence of real parts (I-values) may be digitally filtered with a digital filter prior to digital-to-analog conversion. Likewise, the sequence of imaginary parts (Q-values) may be filtered with an identical filter. Subsequently, the filtered I,Q samples are converted to a continuous time OFDM signal. For example, a pair of identical digital-to-analog converters operating in parallel may be used. Other known methods may also be used, e.g., feeding the sequence I1, Q1, −I1, −Q1, I2, Q2, −I2, −Q2, . . . successively into a single digital-to-analog converter, which results in an output signal shifted in frequency to lie around ¼ the sample rate. In the former method, the outputs of the pair of digital-to-analog converters are smoothed using anti-aliasing or smoothing filters, which comprise low-pass filters. In the latter method, the output of the single digital-to-analog converter may be smoothed using a bandpass filter centered on the frequency corresponding to ¼ the sample rate. Regardless of the type of digital-to-analog conversion used, analog smoothing filters 140, 142 are used to limit the unwanted spectral components.

It will be appreciated that pre-compensation unit 120 may alternatively or additionally pre-compensate for any fixed or variable filters in the transmission chain, e.g., any optional digital filters 137 after the transform unit 136 and before any digital-to-analog conversion that are either fixed of selectively configured based on the number of data symbols per OFDM symbol period input to the transform unit 136. In one example, the pre-compensation unit 120 may pre-compensate the digital frequency-domain samples for amplitude and/or group delay errors arising from a digital filter operating on the frequency transformed output while such data is still in memory. In another example, the pre-compensation unit 120 may pre-compensate the digital frequency-domain samples for amplitude and/or group delay errors arising from a digital filter disposed after the serializer 138 and before any digital-to-analog converter 139.

By pre-compensating the digital frequency-domain samples of an input data block, the pre-compensation unit 120 of the present invention enables the OFDM transmitter 100 use any desired filter to generate a filtered transmission signal without sacrificing amplifier performance across the allocated spectrum. Thus, the transceiver 100 of the present invention will provide a remote receiver with more accurate pilot symbols, which enables the receiver to more accurately characterize the propagation channel.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of generating a filtered analog transmission signal for transmission to a remote device, wherein the filtered analog transmission signal comprises multiple frequency components, the method comprising:
generating a modulated multi-frequency signal stream from digital frequency-domain samples input to a modulator;
filtering the modulated multi-frequency signal stream using one or more filters to suppress out-of-band spectral components from the filtered analog transmission signal, said one or more filters collectively having a frequency-domain response over the multiple frequency components comprising a first maximum error relative to a desired frequency response; and
pre-compensating one or more of the digital frequency-domain samples using a pre-compensation unit such that a collective frequency-domain response of the pre-compensation unit and the one or more filters comprises a second maximum error relative to the desired frequency response less than the first maximum error.

2. The method of claim 1 wherein the first maximum error comprises at least one of a first maximum group delay error relative to a flat group delay and a first maximum amplitude error relative to a flat amplitude, and wherein the second maximum error comprises at least one of a second maximum group delay error relative to a flat group delay less than the first maximum group delay error and a second maximum amplitude error relative to a flat amplitude less than the first maximum amplitude error.

3. The method of claim 2 wherein pre-compensating one or more of the digital frequency-domain samples comprises pre-compensating an amplitude and a phase of one or more of the digital frequency-domain samples such that the collective frequency-domain response of the pre-compensation unit and the one or more filters comprises the second maximum group delay error and the second maximum amplitude error.

4. The method of claim 1 further comprising determining frequency-specific complex factors based on frequency-specific errors relative to the desired frequency response, wherein pre-compensating one or more of the digital frequency-domain samples comprises multiplying one or more of the digital frequency-domain samples by the corresponding complex factor.

5. The method of claim 4 further comprising storing the complex factors in a look-up table, wherein multiplying one or more of the digital frequency-domain samples by the corresponding complex factor comprises retrieving complex factors from the look-up table and multiplying each of the retrieved complex factors by the corresponding digital frequency-domain sample.

6. The method of claim 1 further comprising upconverting the modulated multi-frequency signal stream to a predetermined radio frequency, wherein filtering the modulated multi-frequency signal stream comprises filtering the modulated multi-frequency signal stream with one or more baseband filters to suppress out-of-band spectral components at baseband and filtering the upconverted modulated multi-frequency signal stream with one or more RF filters to suppress out-of-band spectral components at RF, and wherein pre-compensating one or more of the digital frequency-domain samples comprises:
multiplying one or more of the digital frequency-domain samples by a corresponding baseband complex factor determined based on frequency-specific errors associated with the collective frequency response of the one or more baseband filters relative to the desired frequency response; and
multiplying one or more of the digital frequency-domain samples by a corresponding RF complex factor determined based on frequency-specific errors associated with the collective frequency response of the one or more RF filters relative to the desired frequency response.

7. The method of claim 1 wherein generating the analog transmission signal comprises:
selecting a number of the digital frequency-domain samples based on a desired transmission data rate;
generating an input data block for the selected number of frequency-domain samples for input to a modulator, wherein a size of the modulator exceeds the selected number of digital frequency-domain samples;
padding the input data block to generate an expanded data block having a size matched to the size of the modulator;
modulating the expanded data block to generate a modulated multi-frequency signal stream; and
configuring one or more properties of at least one of the filters based on the selected number of frequency components.

8. The method of claim 7 wherein pre-compensating one or more of the digital frequency-domain samples comprises pre-compensating one or more of the digital frequency-domain samples of the input data block such that the collective frequency-domain response of the pre-compensation unit and the one or more filters comprises the second maximum error, and wherein padding the input data block comprises padding the pre-compensated input data block to generate the expanded data block.

9. The method of claim 1 further comprising:
receiving a signal from a remote device, wherein the received signal comprises multiple frequency components;
determining a preliminary set of scatterer parameters for a reception channel based on the received signal, wherein the preliminary set of scatterer parameters comprises a set of scattering coefficients for each of a plurality of path delays, and wherein each scattering coefficient corresponds to a scattering object;
determining a modified set of scatterer parameters for the future transmission channel by calculating extrapolated scattering coefficients for the modified set of scatterer parameters based on the preliminary set of scatterer parameters, and frequency and time properties associated with the transmission and reception channels; and
estimating a future transmission channel response based on the modified set of scatterer parameters.

10. The method of claim 9 wherein one or more of the multiple frequency components of the received signal were pre-compensated at the remote device such that a collective frequency-domain response of a remote device pre-compensation unit and one or more remote device filters comprises the second maximum error relative to the desired frequency response less than the first maximum error.

11. The method of claim 1 wherein the digital frequency-domain samples comprise OFDM samples, and wherein the filtered analog transmission signal comprises a filtered analog OFDM transmission signal.

12. A wireless transceiver configured to generate a filtered analog transmission signal for transmission to a remote device, wherein the filtered analog transmission signal comprises multiple frequency components, the wireless transceiver comprising:
- a modulator to generate a modulated multi-frequency signal stream from digital frequency-domain samples input to the modulator;
- one or more filters to filter the modulated multi-frequency signal stream to suppress out-of-band spectral components from the filtered analog transmission signal, said one or more filters collectively having a frequency-domain response over the multiple frequency components comprising a first maximum error relative to a desired frequency response; and
- a pre-compensation unit configured to pre-compensate one or more of the digital frequency-domain samples such that a collective frequency-domain response of the pre-compensation unit and the one or more filters comprises a second maximum error relative to the desired frequency response less than the first maximum error.

13. The wireless transceiver of claim 12 wherein the first maximum error comprises at least one of a first maximum group delay error relative to a flat group delay and a first maximum amplitude error relative to a flat amplitude, and wherein the second maximum error comprises at least one of a second maximum group delay error relative to a flat group delay less than the first maximum group delay error and a second maximum amplitude error relative to a flat amplitude less than the first maximum amplitude error.

14. The wireless transceiver of claim 13 wherein the pre-compensation unit is configured to pre-compensate an amplitude and a phase of one or more of the digital frequency-domain samples such that the collective frequency-domain response of the pre-compensation unit and the one or more filters comprises the second maximum group delay error and the second maximum amplitude error.

15. The wireless transceiver of claim 12 further comprising a controller configured to determine frequency-specific complex factors based on frequency-specific errors relative to the desired frequency response, wherein the pre-compensation unit pre-compensates the digital frequency-domain samples by multiplying one or more of the digital frequency-domain samples by the corresponding complex factor.

16. The wireless transceiver of claim 15 further comprising memory configured to store the complex factors in a look-up table, wherein the controller is configured to retrieve one or more complex factors from the look-up table, and wherein the pre-compensation unit is configured to multiply each of the retrieved complex factors by the corresponding digital frequency-domain sample.

17. The wireless transceiver of claim 12 further comprising an upconverter to upconvert the modulated multi-frequency signal stream to a predetermined radio frequency, wherein the one or more filters comprises one or more baseband filters and one or more RF filters, wherein the one or more baseband filters filter the modulated multi-frequency signal stream to suppress out-of-band spectral components at baseband, and wherein the one or more RF filters filter the upconverted modulated multi-frequency signal stream to suppress out-of-band spectral components at RF, and wherein the pre-compensation unit is configured to pre-compensate one or more of the digital frequency-domain samples by:
- multiplying one or more of the digital frequency-domain samples by a corresponding baseband complex factor determined based on frequency-specific errors associated with the collective frequency response of the one or more baseband filters relative to the desired frequency response; and
- multiplying one or more of the digital frequency-domain samples by a corresponding RF complex factor determined based on frequency-specific errors associated with the collective frequency response of the one or more RF filters relative to the desired frequency response.

18. The wireless transceiver of claim 12 further comprising:
- an encoder to encode transmission data to generate an input data block for a selected number of the digital frequency-domain samples,
- wherein the selected number of digital frequency-domain samples is based on a desired transmission data rate,
- wherein a size of the modulator exceeds the selected number of digital frequency-domain samples,
- wherein the modulator is configured to pad the input data block to generate an expanded data block having a size matched to the size of the modulator and modulate the expanded data block to generate the modulated multi-frequency signal stream, and
- wherein at least one of the filters is configured to filter the modulated multi-frequency signal stream based on the selected number of frequency components.

19. The wireless transceiver of claim 18 wherein the pre-compensation unit pre-compensates the digital frequency-domain samples by pre-compensating one or more of the digital frequency-domain samples of the input data block such that the collective frequency-domain response of the pre-compensation unit and the one or more filters comprises the second maximum error, and wherein the modulator pads the input data block by padding the pre-compensated input data block to generate the expanded data block.

20. The wireless transceiver of claim 12 further comprising:
- a receiver unit to receive a signal from a remote device, wherein the received signal comprises multiple frequency components; and
- a receive processor configured to estimate a future transmission channel response by:
  - determining a preliminary set of scatterer parameters for a reception channel based on the received signal, wherein the preliminary set of scatterer parameters comprises a set of scattering coefficients for each of a plurality of path delays, and wherein each scattering coefficient corresponds to a scattering object; and
  - determining a modified set of scatterer parameters for the future transmission channel by calculating extrapolated scattering coefficients for the modified set of scatterer parameters based on the preliminary set of scatterer parameters, and frequency and time properties associated with the transmission and reception channels.

21. The wireless transceiver of claim 20 wherein one or more of the multiple frequency components of the received signal were pre-compensated at the remote device such that a collective frequency-domain response of a remote device pre-compensation unit and one or more remote device filters comprises the second maximum error relative to the desired frequency response less than the first maximum error.

22. The wireless transceiver of claim 12 wherein the digital frequency-domain samples comprise digital OFDM samples, and wherein the filtered analog transmission signal comprises a filtered analog OFDM transmission signal.

* * * * *

UNITED STATES PATENT AND TRADEMARK OFFICE
CERTIFICATE OF CORRECTION

| | |
|---|---|
| PATENT NO. | : 8,160,176 B2 |
| APPLICATION NO. | : 12/562225 |
| DATED | : April 17, 2012 |
| INVENTOR(S) | : Dent et al. |

It is certified that error appears in the above-identified patent and that said Letters Patent is hereby corrected as shown below:

On the Title Page:

Item (57), under "ABSTRACT", in Column 2, Line 10, delete "In so doing," and insert -- In doing so, --, therefor.

In the Specifications:

In Column 4, Line 52, delete "is the an" and insert -- an --, therefor.

In Column 8, Line 26, delete "RE" and insert -- RF --, therefor.

In Column 9, Line 61, delete "RE" and insert -- RF --, therefor.

In Column 10, Line 32, delete "RE" and insert -- RF --, therefor.

In the Claims:

In Column 16, Line 2, in Claim 17, delete "RE" and insert -- RF --, therefor.

Signed and Sealed this
Twenty-fifth Day of September, 2012

David J. Kappos
*Director of the United States Patent and Trademark Office*